(12) United States Patent
Thieme et al.

(10) Patent No.: US 8,930,276 B2
(45) Date of Patent: Jan. 6, 2015

(54) METHOD OF MULTIPLE ALGORITHM PROCESSING OF BIOMETRIC DATA

(75) Inventors: Michael Thieme, Jersey City, NJ (US); Samir Nanavati, Jersey City, NJ (US); Rajkumar Nanavati, New York, NY (US); Mcken Mak, Forrest Hills, NY (US)

(73) Assignee: Fusionarc, Inc., New York, NY (US)

( * ) Notice: Subject to any disclaimer, the term of this patent is extended or adjusted under 35 U.S.C. 154(b) by 2171 days.

(21) Appl. No.: 10/524,930

(22) PCT Filed: Aug. 20, 2003

(86) PCT No.: PCT/US03/26091
§ 371 (c)(1),
(2), (4) Date: Feb. 16, 2005

(87) PCT Pub. No.: WO2004/019164
PCT Pub. Date: Mar. 4, 2004

(65) Prior Publication Data
US 2006/0056662 A1    Mar. 16, 2006

Related U.S. Application Data

(60) Provisional application No. 60/404,727, filed on Aug. 20, 2002.

(51) Int. Cl.
*G06F 21/00*    (2013.01)
*G06F 7/04*    (2006.01)
*G06F 17/18*    (2006.01)
*G06K 9/00*    (2006.01)
*G06K 9/68*    (2006.01)
*G06K 9/62*    (2006.01)

(52) U.S. Cl.
CPC ........ *G06K 9/00067* (2013.01); *G06K 9/00885* (2013.01); *G06K 9/685* (2013.01); *G06K 9/6255* (2013.01)
USPC .................................. 705/51; 726/5; 702/179

(58) Field of Classification Search
USPC ...................... 705/1–45, 50–79; 750/150–194
See application file for complete search history.

(56) References Cited

U.S. PATENT DOCUMENTS

| | | | |
|---|---|---|---|
| 5,228,094 A | 7/1993 | Villa | |
| 6,014,468 A * | 1/2000 | McCarthy et al. | 382/254 |
| 6,032,137 A | 2/2000 | Ballard | |
| 6,038,334 A | 3/2000 | Hamid | |
| 6,198,836 B1 * | 3/2001 | Hauke | 382/125 |
| 6,332,193 B1 | 12/2001 | Glass et al. | |
| 6,580,814 B1 | 6/2003 | Ittycheriah | |

(Continued)

OTHER PUBLICATIONS

International Search Report of International Application No. PCT/US03/26091 dated Feb. 27, 2004.

*Primary Examiner* — Alexander Kalinowski
*Assistant Examiner* — Murali Dega
(74) *Attorney, Agent, or Firm* — Katten Muchin Rosenman LLP

(57) ABSTRACT

A method performs processing of biometric information to create multiple templates. This allows biometric systems to be flexible and interact with a plurality of vendors' technologies. Specifically, a biometric sample is captured from a sensor and transmitted to a processing component. The biometric sample is then processed by a first algorithm to yield a biometric template and the template is stored and associated with a record identifier. The biometric sample is also processed by a second algorithm to yield a second template. The second template is stored and associated with the record identifier.

25 Claims, 8 Drawing Sheets

(56) References Cited

U.S. PATENT DOCUMENTS

| | | | |
|---|---|---|---|
| 6,591,224 B1 * | 7/2003 | Sullivan et al. | 702/179 |
| 6,782,120 B2 * | 8/2004 | Modl et al. | 382/124 |
| 6,845,453 B2 * | 1/2005 | Scheidt et al. | 726/5 |
| 6,937,135 B2 * | 8/2005 | Kitson et al. | 340/5.52 |
| 6,963,659 B2 * | 11/2005 | Tumey et al. | 382/116 |
| 7,039,812 B2 * | 5/2006 | Kawan et al. | 713/186 |
| 2001/0025342 A1 | 9/2001 | Uchida | |
| 2003/0037004 A1 * | 2/2003 | Buffum et al. | 705/51 |
| 2003/0218534 A1 * | 11/2003 | LaCous | 340/5.83 |
| 2006/0013451 A1 * | 1/2006 | Haitsma | 382/124 |

\* cited by examiner

US 8,930,276 B2

METHOD OF MULTIPLE ALGORITHM PROCESSING OF BIOMETRIC DATA

CROSS-REFERENCE TO RELATED APPLICATION

This application is the National Stage of International Application No. PCT/US2003/026091, filed Aug. 20, 2003, which claims the benefit under 35 U.S.C. 119 (a-e) of U.S. Provisional Application 60/404,727 filed Aug. 20, 2002, which is herein incorporated by reference.

FIELD OF THE INVENTION

The present invention relates to an identity verification system; and, more particularly, to a method of creating multiple biometric reference templates and biometric match templates from identifiable biometric data.

BACKGROUND OF THE INVENTION

Biometrics is the automated use of physiological or behavioral characteristics to identify an individual or to verify an individual's identity. Biometric technologies such as fingerprint, facial recognition, iris recognition, voice verification, hand geometry, signature verification, keystroke dynamics, and retina scan are commonly used to identify or verify the identity of users attempting to access data on PCs and networks, enter secure facilities, register for public services, execute transactions, and confirm identifies to government officials. Biometrics can complement or replace existing authentication methods such as passwords, PINs, tokens, cards, badges, manual signature verification, manual photograph verification, and challenge-response sequences based on personal information.

Biometric technology is based on the distinctive features resident in fingerprints, faces, irises, retinas, voices, signatures, hands, and other physiological and behavioral characteristics. These features, such as the ridge endings of a fingerprint, the shape and composition facial elements, the striations and furrows of an iris, and the pitch and cadence of a voice, can be associated with specific individuals with a high degree of confidence.

Biometric systems utilize algorithms to locate distinctive features in an automated fashion. The process of locating a physiological or behavioral characteristic's distinctive elements through an algorithm is known as feature extraction. Using information associated with these distinctive elements, biometric systems create what are known as biometric templates. The terms "biometric sample" and "biometric data" refer to the original, identifiable data collected by the input device such as a fingerprint scanner, camera, or microphone. Biometric templates usually encoded such that the original biometric sample, e.g., a fingerprint or a facial image, cannot be reconstructed from the template.

Most biometric systems utilize different types of templates. Biometric templates known as reference templates are generated when an individual enrolls or registers in a biometric system. Reference templates are stored in a biometric system and used as a basis of comparison (as a "reference") for future biometric verification and identification attempts.

Biometric templates known as match templates are generated when an individual provides biometric data in order to be identified or verified—generically speaking, "matched"—against one or more reference templates. Match templates are compared with reference templates to determine their degree of similarity. If the degree of similarity exceeds a given threshold, the two templates are determined to be a "match"; if the degree of similarity fails to exceed a given threshold, the two templates are determined to be a "non-match".

In today's biometric industry, templates stored and processed by biometric systems are unique to each vendor, and are not interoperable. Each of the hundreds of biometric vendors in the industry utilizes proprietary methods of feature extraction, template generation, and template matching. This means that biometric systems are closed systems: a template generated through a given vendor's technology can only be used to verify and identify users enrolled in that vendor's system, and is incompatible with templates generated through other vendors' software.

Furthermore, many biometric systems, especially fingerprint systems, require that users utilize specific hardware devices. Not only do biometric vendors have proprietary feature extraction and template generation software, but most vendors can only enroll and match users only on their own devices. This further underscores the closed nature of today's biometric systems.

In the vast majority of biometric systems, once reference or match templates are generated, the identifiable biometric data—such as the fingerprint image, facial image, or iris image—is deleted, discarded, or destroyed. Since biometric matching is based on comparisons of templates, the identifiable biometric data is only retained temporarily in order to generate a template. Because templates are proprietary and cannot be reverse-engineered to construct identifiable data, no non-proprietary biometric data remains once the original biometric information is deleted. An exception to this is biometric systems used for criminal identification, such as those maintained by federal and state law enforcement agencies. After proprietary biometric templates are generated from the high-resolution fingerprint images acquired by live-scan devices, these biometric systems store identifiable fingerprint data for the purpose of manual resolution of inconclusive automated matches.

Another characteristic of today's biometric systems is that most systems attempt to match enrolled users by means of one matching algorithm as opposed to using a plurality of algorithms. Biometric algorithms are susceptible to both false non-matching, which is the failure to match an authorized individual, and false matching, which is the incorrect matching of an individual. Failure to correctly render a match decision can occur when a feature extraction algorithm locates features not present in the enrollment template, or fails to correctly locate and encode genuine features. Certain biometric systems are less prone to false matching or false non-matching than others, and may be able to provide accurate matching where other systems would fail. However, because match templates associated with a given system can only be used to compare against reference templates generated through that same system's algorithms, and no identifiable data is at hand to perform ad hoc matching, there currently exists no method of comparing a user's match attempt against more than one enrollment template. This reduces the ability of biometric systems to provide accurate matching results.

The proprietary nature of feature extraction, template generation, template matching, and hardware devices, as well as the limited fashion in which identifiable biometric data is currently utilized in biometric systems, are major impediments to the long-term viability of the biometric industry. Once an entity enrolls its employees, customers, or citizens in a given fingerprint system, for example, both the entity and the users are limited to using only this system. Should the entity decide to deploy a new, improved fingerprint system from another provider, all existing users must reenroll in the new system, as existing enrollment templates cannot be used. This poses major logistical challenges, because enrollment in biometric systems can be costly, time-consuming, and often requires that individuals provide documentation or other proof of identity. The problem of enrolling existing users in new, improved versions of a biometric technology has not been addressed in the biometric industry.

Short of total population reenrollment, institutions that deploy biometric technologies such as fingerprint, facial recognition, iris recognition, and voice verification have no protection against device or technology obsolescence. There is effectively no way to "upgrade" from one fingerprint system to another, for example, or to replace older biometric systems of a given technology with more accurate, reliable systems. This problem extends to both biometric hardware and software. In most applications, institutions must deploy specific fingerprint hardware devices in conjunction with fingerprint software. While the hardware may be adequate for future use, the software algorithms could eventually prove to be insufficient for the company's needs. In this case, both the hardware and the software would need to be replaced, and all users reenrolled, in order to move to an improved system. These are significant counterarguments against the deployment of biometric technology.

There are four reasons why this fundamental biometric problem has not been solved.

(1) Biometric vendors prefer to offer closed systems because these systems prevent deployers of their technology from easily moving to another vendor's technology. In closed, template-based systems in which identifiable data is not present, deployers must reenroll all users should they decide to replace a biometric system. This is a significant impediment to larger institutions' upgrading their biometric systems.

(2) The biometric industry has underestimated the problem of enrollment in biometric systems. Using fingerprint as an example, vendors have failed to recognize that requiring users to enroll again and again in a variety of fingerprint systems— for home, work, mobile devices, points of sale, ATMs and kiosks, and anywhere a finger-scan system might be deployed—is highly undesirable for reasons of logistics and trust Initial enrollment and subsequent reenrollment are costly and time-consuming processes for institutions and individuals: institutions must establish and enforce enrollment policies, and users must spend time enrolling in biometric systems.

Enrollment is most valuable to individuals and institutions when it is a one-time event performed under controlled circumstances. During a supervised enrollment process, an individual's identity can be verified with a higher degree of certainty than in remote or unsupervised enrollment. This greater degree of certainty regarding an individual's identity during enrollment means that his or her biometric data can likely be associated with higher-value transactions or used to access more sensitive information. However, when users must enroll anew in every biometric system they encounter, supervised enrollment becomes much less feasible. Even if additional enrollments were to be supervised, institutions cannot be totally certain that the individual who enrolled in system A is the same individual now enrolling in system B, though the supporting information and documentation they provide may appear legitimate. The likelihood of fraudulent enrollment increases, because an individual's identity must be reestablished by non-biometric means with each new enrollment.

(3) For reasons of privacy perception and data management, biometric vendors are normally hesitant to offer solutions that store, process, or transmit identifiable biometric data, preferring instead to utilize proprietary biometric templates. However, various systemic and operational protections can be implemented to significantly reduce the possibility of the misuse or compromise of identifiable biometric data. Moreover, many of the largest biometric systems in the world, including the forensic Automated Fingerprint Identification System (AFIS) technology used by federal and local jurisdictions as well as driver's license systems which utilize facial recognition technology, permanently store and utilize biometric data. From a data management perspective, identifiable biometric data occupies more space than biometric templates, but advances in throughput and device-level storage capability are rendering the biometric data management issue obsolete.

(4) In the fingerprint space, there is a fundamental bifurcation between peripheral vendors and live-scan vendors. Peripheral vendors develop proprietary biometric hardware and software for PC security, physical access, retail, and mobile applications. Live-scan vendors manufacture devices which acquire high-resolution fingerprint images for ongoing use and storage in forensic or civil ID systems. Whereas live-scan vendors are tasked with acquiring detailed fingerprint images whose resolution and size adhere to FBI and other imaging standards, most peripheral vendors acquire smaller, lower-resolution images whose suited solely for template generation within their own system.

The live-scan and peripheral markets are driven by different criteria, and bear different relations to institutions and end users. No technology has emerged capable of acting as a bridge between expensive, higher-quality live-scan devices, whose images are of sufficient quality to generate enrollments on any lower-quality device, and affordable, lower-quality peripheral devices, whose form factor and cost make them well suited for large-scale deployments.

In order to provide deployers with the flexibility to implement new technologies as they come available without discarding an enrolled user base, and in order to address the logistical and trust-related problems of enrollment in biometric systems, a new process is necessary by which individuals can be automatically enrolled and matched in a multiplicity of biometric systems by means of a single piece of identifiable biometric data.

For purposes of this patent match templates includes templates used in 1:1 verification and 1:N identification. Furthermore any references to verification matches also include the process of identification matches and vice-versa.

SUMMARY OF THE INVENTION

It is, therefore, a primary objective of the present invention to provide a method processing biometric information by use of multiple algorithms.

In accordance with one aspect of the present invention, there is provided a method for processing biometric information, comprising the steps of:

(a) capturing a biometric sample from a sensor;
(b) transmitting the biometric sample from the sensor to a processing component;
(c) processing the biometric sample by a first algorithm to yield a first template;
(d) storing the first template with an associated record identifier in a storage component;
(e) processing the biometric sample by a second algorithm to yield a second template;
(f) storing the second template in a storage component; and
(g) associating the second template with the record identifier.

In accordance with another aspect of the present invention, there is provided a method for processing biometric samples to generate templates only after a request from a requesting authority identifying the type of template to be generated.

DETAILED DESCRIPTION OF THE PREFERRED EMBODIMENTS

Figure 1:
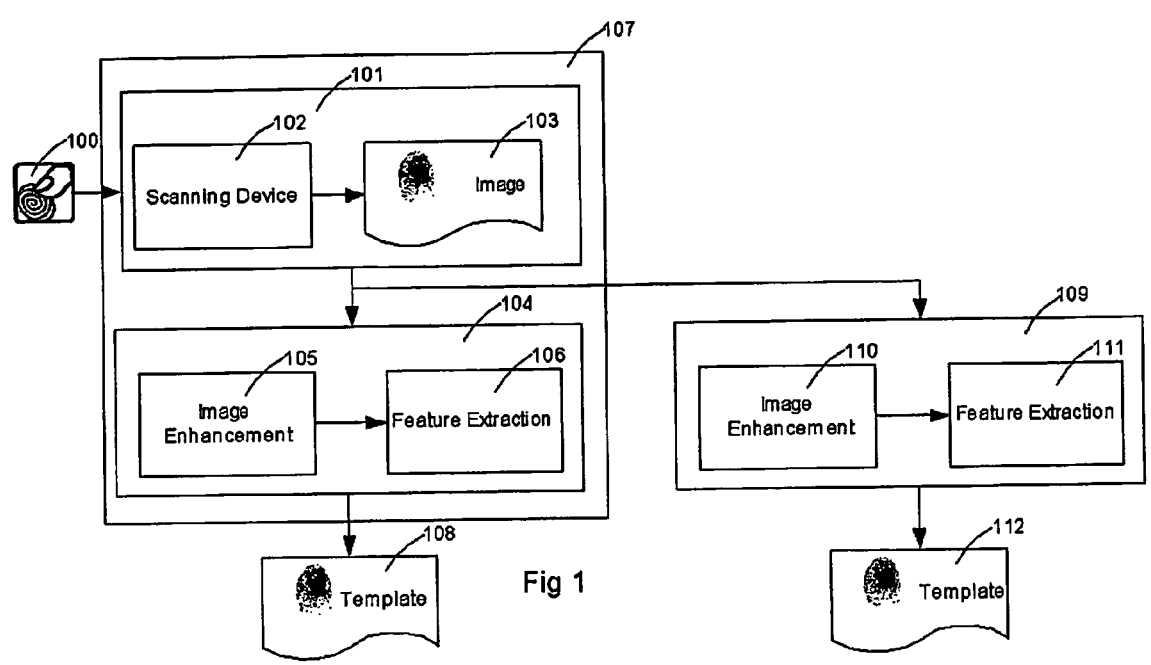
FIG. 1 is a schematic block diagram of a template generation system in accordance with the present invention.

Referring to FIG. 1, there is provided a schematic block diagram of a template generation system 107 incorporating therein a method of processing samples to generate templates for the purposes of storage, enrollment, or matching in accordance with the present invention.

A biometric characteristic 100 is presented to a scanning device 102, which acquires a biometric sample 101, or identifiable biometric data, in the form of an image or recording 103. The image or recording 103 is enhanced and filtered 105, and distinctive characteristics extracted and encoded 106, through a process 104 which results in the generation of a biometric template 108. The template 108 can be used to enroll or match a user or can be stored for subsequent system usage. The same identifiable biometric data 103, or an identical copy thereof, is enhanced and filtered 110, and distinctive characteristics extracted and encoded 111, through a second specific process 109, which results in the generation of a second biometric template 112. The template 112 can be used to enroll or match a user or can be stored for subsequent system usage.

Figure 2:
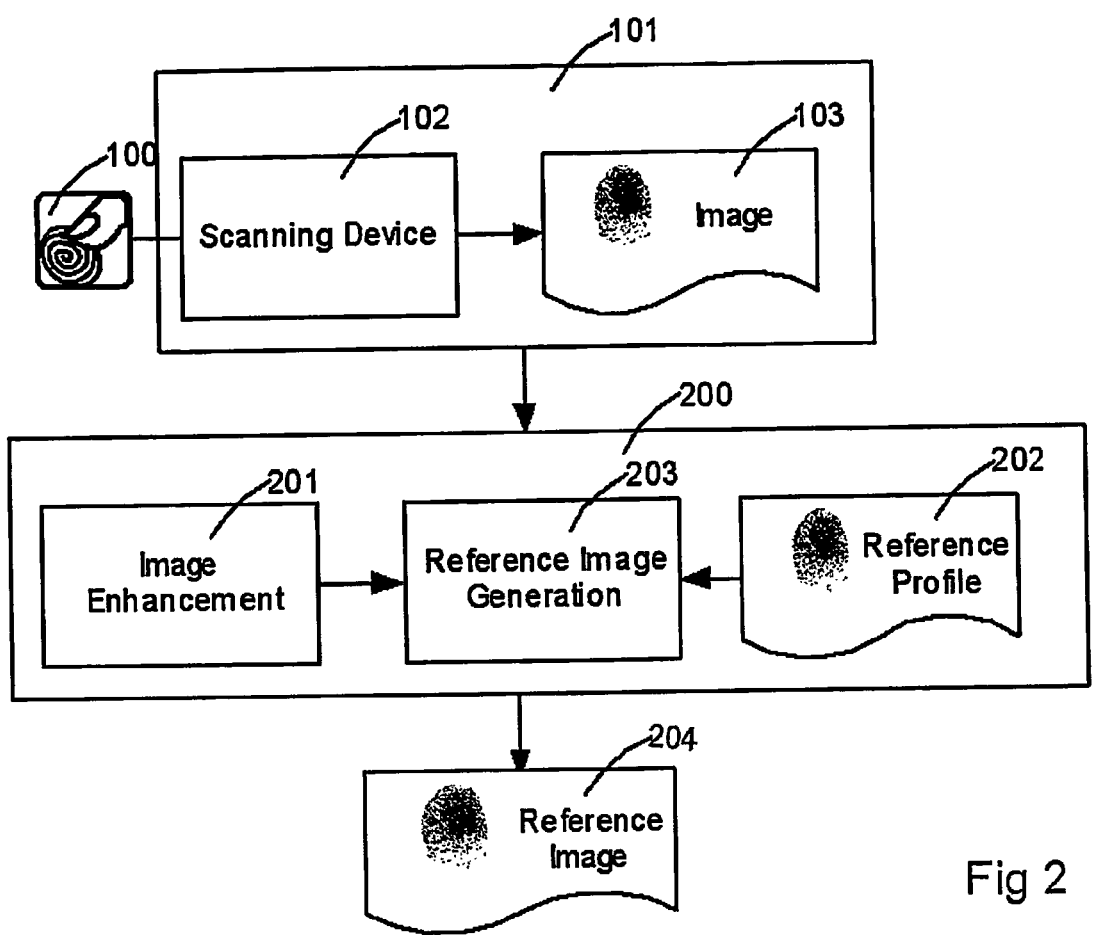
FIG. 2 illustrates the process by which a reference profile is used to create system-specific identifiable biometric images.

Referring to FIG. 2, in order to address the need in the marketplace for interoperability across devices, a method is presented through which a reference profile is used to generate system-specific identifiable images, which allow for automated creation of system-specific templates. This process improves on the traditional biometric acquisition method 101 by processing the enhanced image 201 through a system-specific reference profile 202, which encapsulates key characteristics of the enhanced image such as dimension, resolution, grayscale, shape, and orientation. The reference profile generates 203 a second identifiable image 204 from which system-specific templates can be generated for enrollment, matching, and storage in biometric systems.

Figure 3:
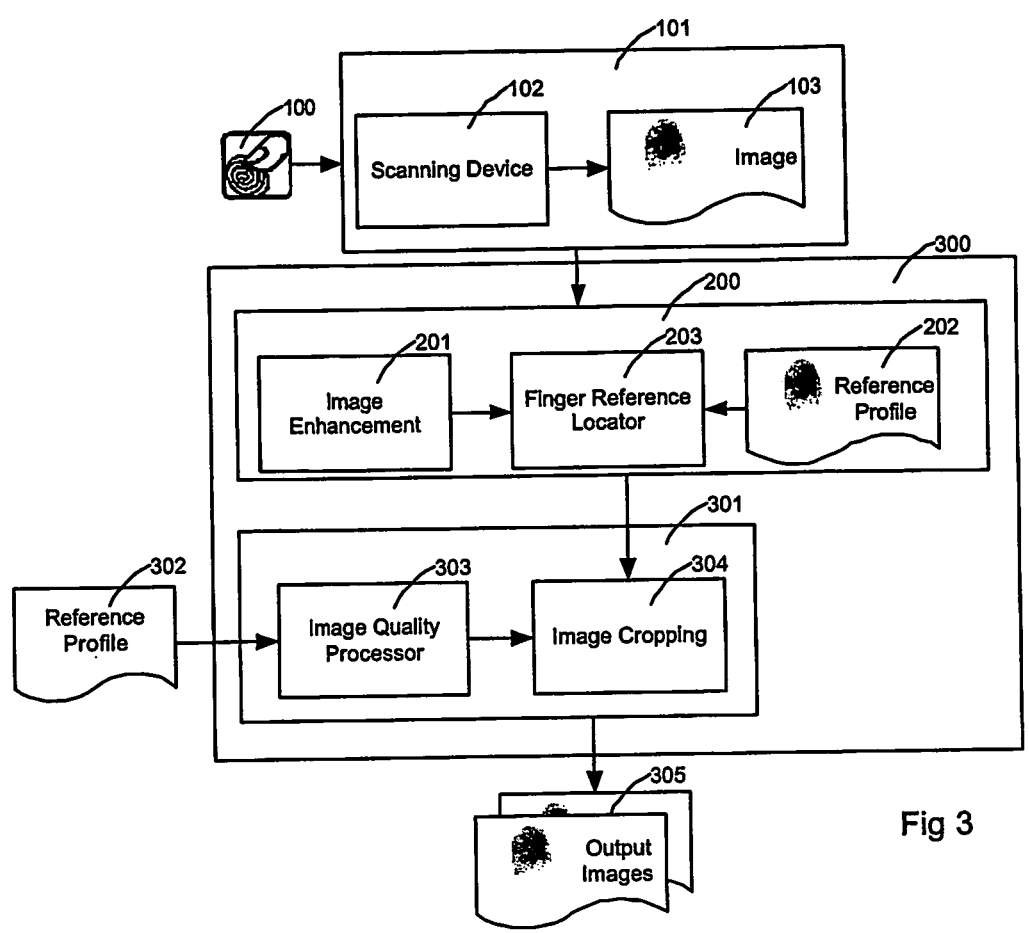
FIG. 3 illustrates the process by which a reference profile works in conjunction with an image enhancement system to create system-specific biometric images.

Referring to FIG. 3, data contained in the reference profile 302 is used to enable an image quality processor 303 and an image cropping component 304. These work in conjunction 301 to produce system-specific images 305.

Figure 4:
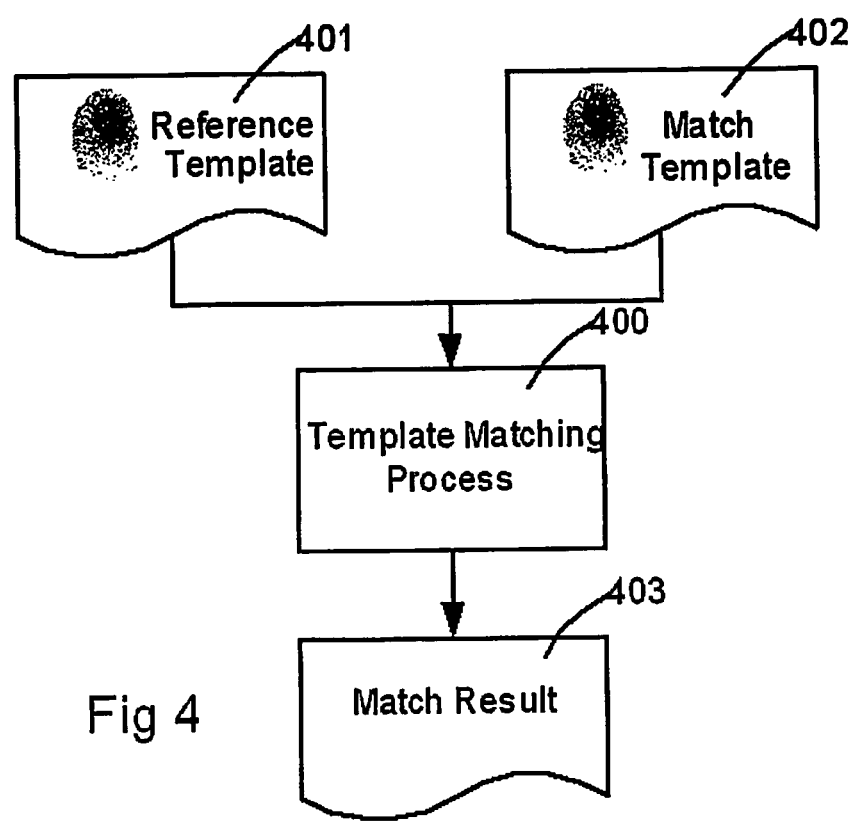
FIG. 4 illustrates a biometric matching process.

Referring to FIG. 4, the standard biometric template matching process is leveraged wherein a reference template 401 stored on file and a match template 402 are compared through a template matching process 400. This template matching process leads to a matching result 403.

Figure 5:
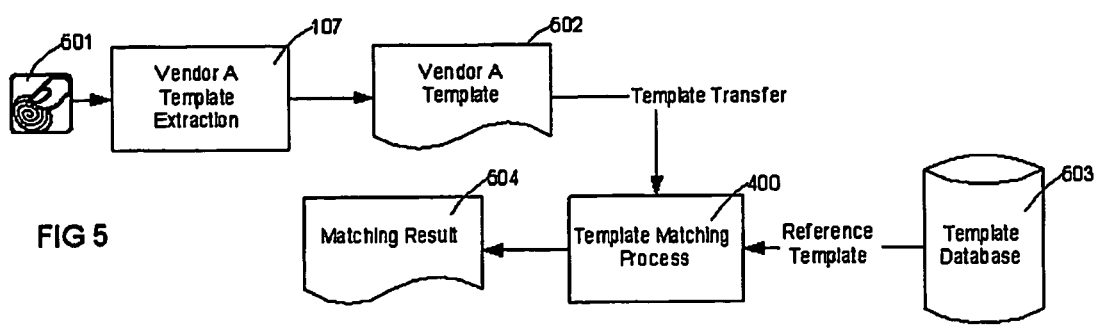
FIG. 5 illustrates a process by which a reference biometric is retrieved from a database for the purposes of matching.

Referring to FIG. 5, in the traditional authentication process, a biometric characteristic 501 is converted through template extraction 107 into a system-specific template 502. This template is compared 400 against a reference template stored in a template database 503 leading to a match result 504.

Figure 6:
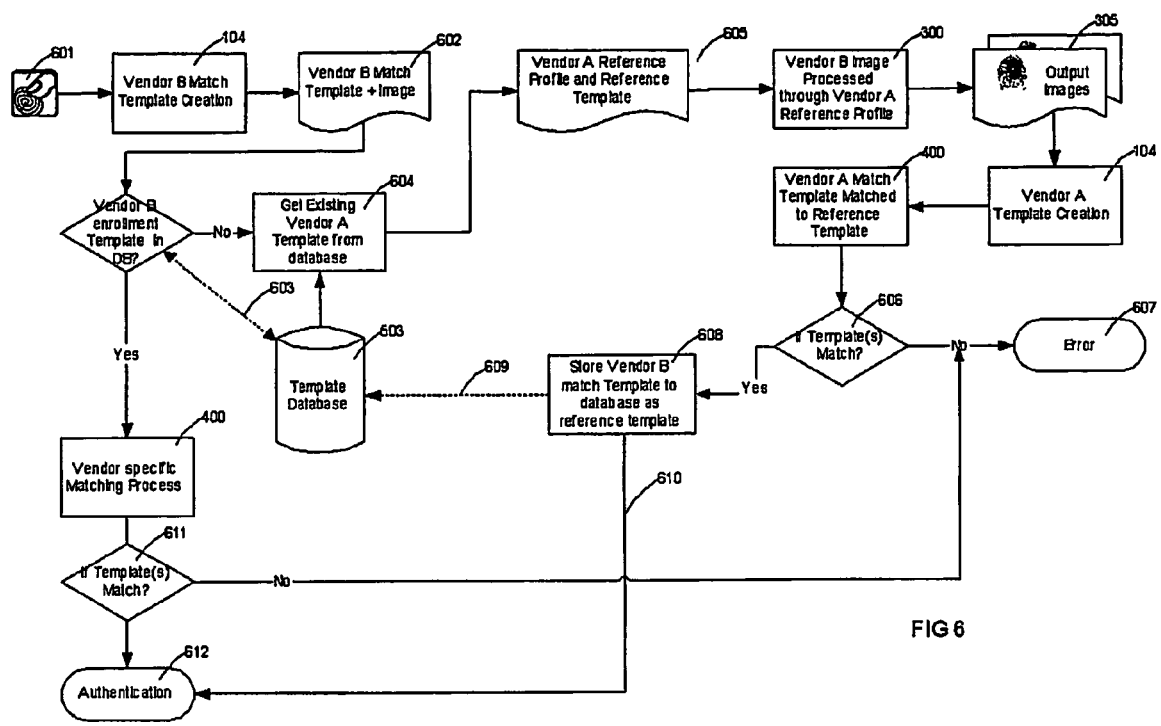
FIG. 6 illustrates the process by which biometric matching takes place in the absence of a reference template.

Referring to FIG. 6, the proposed system improves on the FIG. 5 process by enabling authentication when the reference template is not stored in the template database 503. After system-specific match template creation 104 form the identifiable image 601, both the extracted match template and the identifiable biometric data or sample are temporarily retained 602. The reference database is queried 603 to determine the presence of a reference template from the same system as the match template created in 104. If one or more reference templates from the individual providing data 601 are in the database, the standard authentication process occurs 400, 611. If the reference template is not in the database 503 then an enrollment template from a different biometric system, and associated with the individual providing data, is retrieved from the database 604. The reference profile 605 corresponding to the system whose template is on file 604 is used to process 300 the identifiable biometric data initially retained 602. The resultant images 305 are used to create match templates 104 which are compared 400 against the retrieved enrollment templates 604. If the two templates match 606, then the initial match template generate through the biometric system 104 is stored 608, 609 in the database 503 as a reference template and associated with the individual providing data, thereby expanding the range of biometric devices on which an individual can authenticate. The results of this successful match can be transmitted 610 such that the individual is authenticated 612 based on the legacy enrollment 604. If the templates do not match 611 the transaction reverts to an error state 607.

Figure 7:
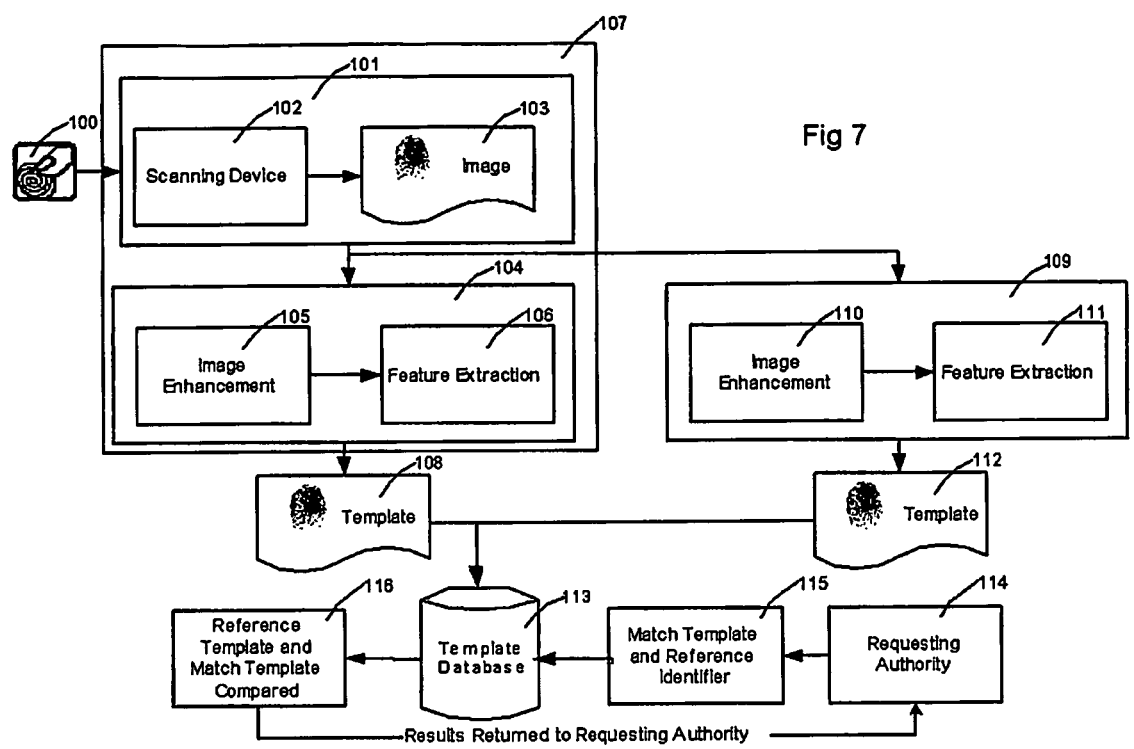
FIG. 7 illustrates a process by which a requesting authority executes matching through communication with a populated biometric database and template identifier.

Referring to FIG. 7, there is provided a schematic block diagram of a template generation system 107 incorporating therein a method of processing samples to generate templates for the purposes of storage, enrollment, and matching in accordance with the present invention.

A biometric characteristic 100 is presented to a scanning device 102, which acquires a biometric sample 101, or identifiable biometric data, in the form of an image or recording 103. The image or recording 103 is enhanced and filtered 105, and distinctive characteristics extracted and encoded 106, through a specific process 104, which results in the generation of a biometric template 108. The template 108 can be used to enroll, verify, or identify a user or can be stored for subsequent system usage. The same identifiable biometric data 103 is enhanced and filtered 110, and distinctive characteristics extracted and encoded 110, through a second specific process 109, which results in the generation of a second biometric template 112. The template 112 can be used to enroll, verify, or identify a user or can be stored for subsequent system usage.

The templates are stored in template database 113. A Requesting Authority 114 sends a request for a biometric match from a requesting authority along with a match template 115, wherein the request identifies a given record identifier. The template database 113 locates from a plurality of storage units a reference template associated with the record identifier compatible with the match template. A template comparison is performed 116 and the result is transmitted to the Requesting Authority 114.

Figure 8:
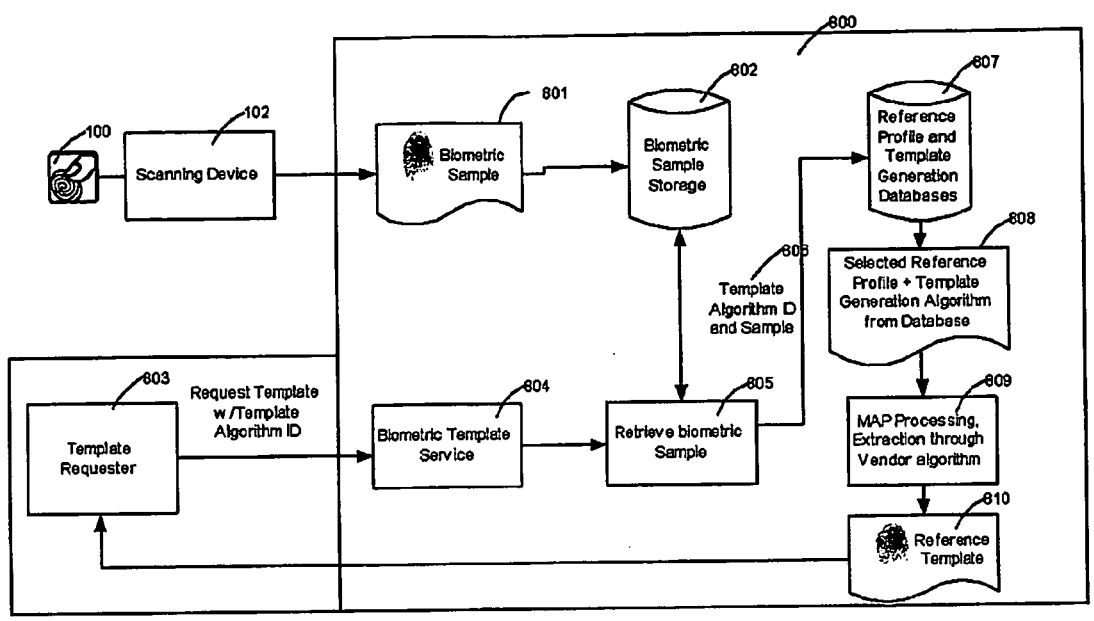
FIG. 8 illustrates a process by which a template request results in the creation on an on-demand reference template used for the purposes of matching.

Referring to FIG. 8, a process is presented 800 by which a biometric sample is stored for the purpose of generating system-specific templates subsequent to request(s) by an authorized authority. In this process, a biometric characteristic 100 is acquired through a scanning device 102. This sample is transmitted 801 to a biometric storage component 802. At this point the biometric sample is available for usage by template requesters. A template requester 803 transmits a template request identifier along with a template algorithm ID. This template algorithm ID defines the algorithm through which a match template is to be generated for the template requester. A biometric template service 804 routes request packages in order to retrieve one or more biometric samples 805 from biometric storage 802. The biometric sample is transmitted along with the template algorithm ID 806 in order to retrieve the necessary system profile from the reference profile database and template generation databases 807. Once the reference profile and the template generation algorithm are selected 808 from the system profile database 807, the sample can be processed through the Multiple Algorithm Processing sequence 809, as per FIG. 3, in order to generate a compatible reference template 810. The reference template 810 can then be transmitted to the template requester for validation.

What is claimed is:

1. A method for processing biometric information, comprising the steps of:
    capturing a first biometric sample of a live subject from a single device;
    transmitting the first biometric sample from the device to a processing component;
    processing the first biometric sample by a first vendor's template generation algorithm to yield a first reference template;
    associating the first reference template with a record identifier;
    processing the first biometric sample by a second vendor's template generation algorithm to yield a second reference template;
    associating the second reference template with the record identifier; and
    processing a subsequent biometric sample for verification of the live subject by a template generation algorithm to create a match template,
    wherein the template generation algorithm may be the first vendor's template generation algorithm, the second vendor's template generation algorithm, or a different template generation algorithm;
    performing, by a computer, a comparison between the match template and of the first reference templates or the second reference template;
    determining, using the computer, a degree of similarity based on the comparison; and
    authenticating the live subject based on the degree of similarity.

2. The method of claim 1, further comprising the steps of:
    processing the first biometric sample by one or more additional vendor's template generation algorithms to yield one or more additional reference templates; and
    associating the one or more additional reference templates with the record identifier.

3. The method of claim 1, further comprising the steps of:
    receiving a request for a type of template from a requesting authority, wherein the request identifies a the type of template needed to perform a match and the record identifier;
    determining from a plurality of storage units if the requested type of template is available for the record identifier; and
    transmitting the type of template requested to the requesting authority.

4. The method of claim 1, further comprising the steps of:
    receiving a request for a biometric match from a requesting authority along with a the match template, wherein the request identifies the record identifier;
    locating from a plurality of storage units a reference template associated with the record identifier that is compatible with the match template; and
    performing a template comparison between the match template and the located reference template.

5. The method of claim 4, further comprising the step of returning the result of the template comparison to the requesting authority.

6. The method of claim 1, wherein the template generation algorithms includes minutiae matching, pattern matching, vector line analysis, Eigenface, or neural network processing.

7. The method of claim 1, wherein the processing to yield the first and second reference templates is preceded by an image pre-processing step wherein the first biometric sample is modified according to information in a vendor profile associated with the vendor's algorithm.

8. The method of claim 7, wherein the information in the vendor profile include image dimension, resolution, scale, speed, time, frequency, or orientation.

9. The method of claim 7, wherein the vendor profile is created prior to the image pre-processing step based on features associated with a specific algorithm.

10. The method of claim 7, wherein the image pre-processing comprises the steps of:
    extracting several different sub-samples from the first biometric sample by means for superimposing geometric shapes on the first biometric sample, wherein the geometric shapes are associated with the vendor profile; and
    performing a match between a reference template created from the sub-samples and one of the reference templates.

11. The method of claim 10, wherein the geometric shapes are rectangles.

12. The method of claim 1, wherein the first and second biometric samples include a fingerprint, a facial image, an iris image, a retina image, a voiceprint, a DNA sample, a hand shape, a signature, or a gait.

13. The method of claim 1, wherein the single device is a livescan input device with at least 400 dots per square inch resolution.

14. The method of claim 1, wherein the first and second vendor's template generation algorithms perform feature extraction.

15. The method of claim 1, further comprising the step of granting access or privilege rights to the subject when the degree of similarity meets a specified threshold.

16. The method of claim 1 wherein the comparison is made using a weighting algorithm.

17. The method of claim 1, wherein the single device includes one or more sensors.

18. The method of claim 1, wherein the template comparison is performed on a centralized server.

19. The method of claim 1, wherein the template comparison is performed locally in proximity to the device.

20. A method for processing biometric information using a computer with a processor, comprising the steps of:
    capturing a first biometric sample of a live subject from a single device;

transmitting the first biometric sample from the device to a storage component;

receiving a request from a requesting authority, wherein the request identifies a vendor and associated template generation algorithm to be used in creating a reference template, and the reference template is not created until the request is received from the requesting authority;

processing the first biometric sample by the identified vendor's template generation algorithm to create the reference template; and processing a subsequent biometric sample for verification of the live subject by a template generation algorithm to create a match template, wherein the template generation algorithm may be the first vendor's template generation algorithm, the second vendor's template generation algorithm, or a different template generation algorithm;

performing, by a computer, a comparison between the match template and the first reference templates or the second reference template;

determining, using the computer, a degree of similarity based on the comparison; and authenticating the live subject based on the degree of similarity.

21. The method of claim 20 further comprising the step of returning the reference template to the requesting authority.

22. The method of claim 20, wherein the first and second vendor's template generation algorithms perform feature extraction.

23. The method of claim 22 further comprising the step of returning the degree of similarity to the requesting authority.

24. A method for processing biometric information using a computer with a processor, comprising the steps of:

retrieving a first biometric sample of a live subject captured by a single device from a storage component;

transmitting the first biometric sample from the storage component to a processing component;

processing the first biometric sample by a first vendor's template generation algorithm to yield a first reference template;

associating the first reference template with a record identifier;

processing the first biometric sample by a second vendor's template generation algorithm to yield a second reference template;

associating the second reference template with the record identifier; and processing a subsequent biometric sample for verification of the live subject by a template generation algorithm to create a match template, wherein the template generation algorithm may be the first vendor's template generation algorithm, the second vendor's template generation algorithm, or a different template generation algorithm;

performing, by a computer, a comparison between the match template and the first reference templates or the second reference template;

determining, using the computer, a degree of similarity based on the comparison; and authenticating the live subject based on the degree of similarity.

25. The method of claim 24, further comprising the steps of:

processing the first biometric sample by one or more additional vendor's template generation algorithms to yield one or more additional reference templates; and associating the one or more additional reference templates with the record identifier.

* * * * *